Nov. 25, 1947.  R. PUDELKO ET AL  2,431,503
SPRING MOTOR MOUNTING
Filed May 13, 1944
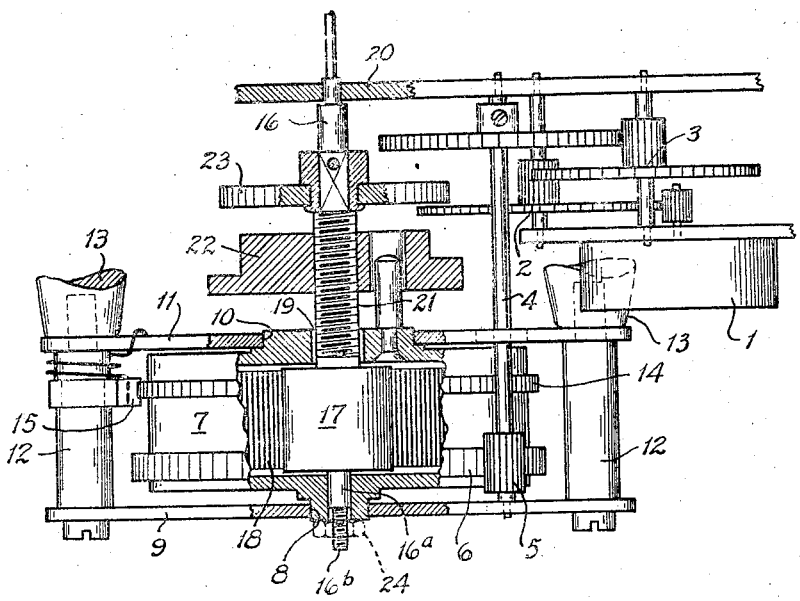
INVENTORS
Richard Pudelko
Ernest Widmer
BY
Morgan, Finnegan & Durham
ATTORNEYS Patented Nov. 25, 1947

2,431,503

UNITED STATES PATENT OFFICE 2,431,503

SPRING MOTOR MOUNTING

Richard Pudelko, Zug, and Ernst Widmer, Oberwil/Zug, Switzerland, assignors to Landis & Gyr, A. G., Zug, Switzerland, a corporation of Switzerland Application May 13, 1944, Serial No. 535,500
In Switzerland May 17, 1943

4 Claims. (Cl. 185—37)

This invention relates to motor wound clock spring mechanisms and refers more particularly to an arrangement of bearing surfaces to support the spring housing and the spring shaft of the clock, such arrangement resulting in the spring housing and shaft being readily removable as a unit. The invention further includes means permitting the removal of the above unit from the clock with the spring fully or partially wound.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

As to the drawing, referred to herein and constituting a part hereof, it illustrates one embodiment of the invention, and together with the description, serves to explain the principles of the invention.

In accordance with the illustrative embodiment of the present invention, the spring housing hub is journalled in the back plate of the clock works and in an outer plate to the rear of the back plate, while the spring shaft is journalled in the said hub and in another plate of the clock works, rearwardly of the rear plate. The spring shaft moreover has a large shoulder inside the spring housing and a threaded portion extending forwardly form the hub, so that a nut threaded thereon may be used to tighten the shoulder against the interior wall of the spring housing and the entire unit of housing and shaft may be removed with the spring under tension.

The above bearing arrangement is advantageous in that the parts are suitably supported with a minimum of bearing surface. The construction permitting removal of the unit with the spring under tension makes it easier to repair the clock, obviating the necessity of permitting the spring to run down before proceeding with removal.

Referring to the drawing, the electric motor 1 is connected via gears 2, 3, shaft 4 and gear 5 to gear 6 mounted on the exterior cylindrical surface of the spring housing 7 of the clock works. One hub 8 of housing 7 is journalled in outer plate 9 while the other hub 10 is journalled in rear plate 11 of the clock works, plate 9 being supported relative to plate 11 by the pillars 12 spacing the two and engaging standards 13 of the clock works. A ratchet gear 14 on housing 7 is engaged by pawl 15 pivoted on one of the pillars 12 and spring actuated into said engagement.

The spring shaft 16 has an enlarged cylindrical portion 17 inside spring housing 7, and spring 18 is connected to said portion and to the interior cylindrical wall of housing 7 in usual manner. Shaft 16 is journalled as at 16a concentrically in hub 8 and extends freely through aperture 19 in hub 10 to a bearing seat in plate 20 of the clock works rearward of rear plate 11.

Between plates 11 and 20 shaft 16 bears scape wheel 23 in operative relation to the remainder of the clock works, not shown, and a travelling nut 22 engaging a threaded portion 21, the nut being effective to switch motor 1 on when the spring has unwound to a certain point and switch it off when the spring has been wound up.

A threaded terminal portion 16b of shaft 16, commencing at the forward end of the bearing portion of said shaft within hub 8 and extending therebeyond, is engaged by a nut 24, which on being screwed down, abuts the hub and draws the shaft 16 forward axially so that the enlarged portion 17 frictionally engages the interior flat wall of hub 8 forming part of the interior flat wall of spring housing 7. Shaft 16 may thus be fixed against rotation relative to the spring housing.

When it is desired to remove shaft 16 and housing 7 from the clock in case of repair, the same is accomplished by tightening nut 24, removing the screws of pillars 12, removing outer plate 9 and finally housing 7 and shaft 16 as a unit.

In assembling the clock either initially or after repair, it can be hand wound by revolving casing 7, and will run and may be regulated, all independently of the electric motor and its gear train.

The invention in its broader aspects is not limited to the specific mechanisms shown and described but departures may be made therefrom within the scope of the accompanying claims without departing from the principles of the invention and without sacrificing its chief advantage.

What is claimed is:

1. Clock spring mechanism, comprising, in combination with a clock mechanism, an outer plate mounted outwardly of the rear plate of said clock mechanism, a spring housing comprising hub portions journalled in said plates and a spring shaft journalled in the one of said hub portions journalled in said outer plate, said spring shaft further extending freely through an aperture formed in said other hub portion and being journalled in another plate of said clock mechanism.

2. Clock spring mechanism, comprising, in combination with a clock mechanism, an outer plate mounted outwardly of the rear plate of said clock mechanism, a spring housing comprising hub portions journalled in said plates and a spring shaft journalled in the one of said hub portions journalled in said outer plate, said spring shaft further extending freely through an aperture formed in said other hub portion and being journalled in another plate of said clock mechanism said other plate being located rearwardly of said rear plate.

3. A clock spring mechanism of the type comprising a spring housing journalled in two plates and a spring shaft journalled in a hub of said housing and in a third plate, said shaft comprising an enlarged portion located inside said housing, said mechanism further comprising means for frictionally engaging said portion with an interior portion of said housing to prevent rotation of said shaft relative to said housing.

4. A clock spring mechanism of the type comprising a spring housing journalled in two plates and a spring shaft journalled in a hub of said housing and in a third plate, said shaft comprising an enlarged portion located inside said housing, said shaft further comprising a threaded portion, and threaded means engaging said threaded portion and adapted by abutting said hub to draw said enlarged portion into frictional engagement with an interior surface of said housing whereby said shaft is fixed against rotation relative to said housing.

RICHARD PUDELKO.
ERNST WIDMER.

REFERENCES CITED

The following references are of record in the file of this patent:

UNITED STATES PATENTS

| Number | Name | Date |
|---|---|---|
| 1,096,829 | Cyarnikow | May 19, 1914 |

FOREIGN PATENTS

| Number | Country | Date |
|---|---|---|
| 285,732 | Germany | July 12, 1915 |